(12) United States Patent
Fong et al.

(10) Patent No.: US 12,120,692 B2
(45) Date of Patent: Oct. 15, 2024

(54) SCHEDULING RESOURCES FOR USER EQUIPMENT (UE) SIDELINK COMMUNICATION

(71) Applicant: QUALCOMM Incorporated, San Diego, CA (US)

(72) Inventors: Lik Hang Silas Fong, Bridgewater, NJ (US); Jing Sun, San Diego, CA (US); Piyush Gupta, Bridgewater, NJ (US); Junyi Li, Franklin Park, NJ (US); Xiaoxia Zhang, San Diego, CA (US); Xiaojie Wang, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 444 days.

(21) Appl. No.: 17/198,949

(22) Filed: Mar. 11, 2021

(65) Prior Publication Data

US 2021/0377919 A1 Dec. 2, 2021

Related U.S. Application Data

(60) Provisional application No. 63/032,420, filed on May 29, 2020.

(51) Int. Cl.
*H04W 72/23* (2023.01)
*H04L 1/00* (2006.01)
(Continued)

(52) U.S. Cl.
CPC ........... *H04W 72/23* (2023.01); *H04L 1/0061* (2013.01); *H04L 1/1812* (2013.01);
(Continued)

(58) Field of Classification Search
None
See application file for complete search history.

(56) References Cited

U.S. PATENT DOCUMENTS

| | | |
|---|---|---|
| 2020/0022089 A1 | 1/2020 | Guo |
| 2022/0015167 A1* | 1/2022 | Kim ..................... H04W 76/38 |

(Continued)

FOREIGN PATENT DOCUMENTS

| | | | |
|---|---|---|---|
| WO | WO-2020030703 A1 | | 2/2020 |
| WO | WO2021226972 | * | 5/2020 |

OTHER PUBLICATIONS

Author Unknown, Sidelink Resource Allocation Mechanism for NR V2X, Doc. No. R1-1902997, pp. 1-11, Mar. 1, 2019.*

(Continued)

*Primary Examiner* — Christopher M Crutchfield
(74) *Attorney, Agent, or Firm* — Norton Rose Fulbright LLP

(57) ABSTRACT

Systems and non-transitory computer-readable mediums for scheduling resources for a specific sidelink are described. Some embodiments provide scheduling of resources for a sidelink between a first user equipment (UE) in communication with a base station and a specified second UE in communication with the first UE, such as using downlink control information (DCI) and/or radio resource control (RRC) signaling. The scheduling of sidelink resources may be with respect to a dynamic grant (DG) or a configured grant (CG). Other aspects and features are also claimed and described.

30 Claims, 7 Drawing Sheets

(51) Int. Cl.
  *H04L 1/1812* (2023.01)
  *H04L 1/1829* (2023.01)
  *H04W 4/46* (2018.01)
  *H04W 72/21* (2023.01)
  *H04W 76/23* (2018.01)
  *H04W 92/18* (2009.01)

(52) U.S. Cl.
  CPC .............. *H04L 1/1861* (2013.01); *H04W 4/46* (2018.02); *H04W 72/21* (2023.01); *H04W 76/23* (2018.02); *H04W 92/18* (2013.01)

(56) References Cited

U.S. PATENT DOCUMENTS

| | | | |
|---|---|---|---|
| 2023/0057942 A1* | 2/2023 | Zhang | H04L 1/12 |
| 2023/0066448 A1* | 3/2023 | Tseng | H04W 76/28 |
| 2023/0171039 A1* | 6/2023 | Lee | H04L 1/1822 370/329 |
| 2023/0171714 A1* | 6/2023 | Oh | H04W 72/40 370/330 |
| 2023/0171793 A1* | 6/2023 | Kim | H04W 72/40 370/329 |

OTHER PUBLICATIONS

Author Unknown, Sidelink Resource Allocation Mechanism for NR V2X, Doc. No. R1-1903345, pp. 1-12, Mar. 1, 2019.*
International Search Report and Written Opinion—PCT/US2021/024606—ISA/EPO—Jul. 6, 2021 (205216WO).
Samsung: "Considerations on Sidelink HARQ Procedure", 3GPP Draft, 3GPP TSG RAN WG1 #96, R1-1902278, 3GPP TSG RAN WG1, Meeting #96, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 15, 2019 (Feb. 15, 2019), XP051599973, 11 Pages, Retrieved from the Internet: URL:http://www.3gpp.org/ftp/tsg%5Fran/WG1%5FRL1/TSGR1%5F96/Docs/R1%2D1902278%2Ezip [retrieved on Feb. 15, 2019], pp. 1-3, section "3 Sidelink HARQ in Mode 1", section "4 CBG-based transmission in Unicast", section "5 CBG-based transmission in Groupcast", section "6 Conclusions", Proposals 2-7.

* cited by examiner

SCHEDULING RESOURCES FOR USER EQUIPMENT (UE) SIDELINK COMMUNICATION

CROSS-REFERENCE TO RELATED APPLICATIONS

This application claims the benefit of U.S. Provisional Patent Application No. 63/032,420, entitled, "SCHEDULING RESOURCES FOR USER EQUIPMENT (UE) SIDELINK COMMUNICATION," filed on May 29, 2020, the disclosure of which is expressly incorporated by reference herein in its entirety as if fully set forth below and for all applicable purposes.

TECHNICAL FIELD

Aspects of the present disclosure relate generally to wireless communication systems, and more particularly, to scheduling resources for user equipment (UE) sidelink communication. Certain embodiments of the technology discussed below can enable and provide scheduling of resources for a sidelink between a first UE in communication with a base station and a specified second UE in communication with the first UE, such as using downlink control information (DCI) and/or radio resource control (RRC) signaling.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

The UEs may comprise various device configurations, such as a mobile wireless device, an Internet of Things (IoT) or Internet of Everything (IoE) device, etc., and may have particular associated communication needs and/or requirements. For example, latency and reliability requirements for Industrial Internet of Things (IIoT) traffic are stringent (e.g., latency $\approx$1-2 ms and reliability$\approx 10^{-5}$-$10^{-6}$ block error rate (BLER)). The aforementioned interference presents challenges with respect to some wireless communications meeting needs and/or requirements of the particular wireless devices and situations.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method may include scheduling resources for a sidelink between a first user equipment (UE) and a specified second UE. The first UE may be in communication with a base station and may be a UE to transmit to the specified second UE via the sidelink. The method may also include transmitting control signaling to the first UE to implement the sidelink between the first UE and the specified second UE in accordance with the scheduling. The control signaling may be configured to identify the specified second UE.

In an additional aspect of the disclosure, an apparatus configured for wireless communication is provided. The apparatus may include means for scheduling resources for a sidelink between a first UE and a specified second UE. The first UE may be in communication with a base station and may be a UE to transmit to the specified second UE via the sidelink. The apparatus may also include means for transmitting control signaling to the first UE to implement the sidelink between the first UE and the specified second UE in accordance with the scheduling. The control signaling may be configured to identify the specified second UE.

In an additional aspect of the disclosure, a non-transitory computer-readable medium having program code recorded thereon for wireless communication is provided. The program code may include code to schedule resources for a sidelink between a first UE and a specified second UE. The first UE may be in communication with a base station and may be a UE to transmit to the specified second UE via the sidelink. The program code may also include code to transmit control signaling to the first UE to implement the sidelink between the first UE and the specified second UE in accordance with the scheduling. The control signaling may be configured to identify the specified second UE.

In an additional aspect of the disclosure, an apparatus configured for wireless communication is provided. The apparatus includes at least one processor, and a memory coupled to the processor. The processor may be configured to schedule resources for a sidelink between a first UE and a specified second UE. The first UE may be in communication with the base station and may be a UE to transmit to the specified second UE via the sidelink. The processor may also be configured to transmit control signaling to the first UE to implement the sidelink between the first UE and the specified second UE in accordance with the scheduling. The control signaling may be configured to identify the specified second UE.

In accordance with aspects of the disclosure, the foregoing systems, methods, and apparatuses may be implemented in combination with one or more additional features, such as the following features whether alone or in combination. For example, the above systems, methods, and apparatuses may include the control signaling including downlink control information (DCI). The above systems, methods, and apparatuses may include the DCI being according to DCI format 3_0. The above systems, methods, and apparatuses may include controlling resources allocated to the sidelink between the first UE and the specified second UE using the DCI. The above systems, methods, and apparatuses may include determining if additional resource allocation is to be provided for the sidelink between the first UE and the specified second UE based at least in part on an acknowledgment/negative-acknowledgment (ACK/NACK) received from the first UE via a physical uplink control channel (PUCCH). The above systems, methods, and apparatuses may include the DCI being configured to carry a sidelink receiver UE indicator. The above systems, methods, and apparatuses may include a field being included in the DCI to carry the sidelink receiver UE indicator. The above systems, methods, and apparatuses may include a field of the DCI being repurposed to carry the sidelink receiver UE indicator. The above systems, methods, and apparatuses may include the sidelink receiver UE indicator including an index value corresponding to the specified second UE to indicate the specified second UE as a receiver UE for the sidelink. The above systems, methods, and apparatuses may include configuring a mapping from an identification of the specified second UE to the index value via radio resource control (RRC) signaling. The above systems, methods, and apparatuses may include the scheduling being with respect to a dynamic grant (DG), and scrambling a cyclic redundancy check (CRC) of the DCI using a sidelink-radio network temporary identifier (SL-RNTI) corresponding to the first UE. The above systems, methods, and apparatuses may include the scheduling being with respect to a configured grant (CG), and scrambling a CRC of the DCI using a sidelink-configured scheduling-radio network temporary identifier (SL-CS-RNTI) corresponding to the first UE. The above systems, methods, and apparatuses may include associating, by the base station, one or more hybrid automatic repeat request (HARQ) process identifiers with the specified second UE. The above systems, methods, and apparatuses may include the DCI carrying the one or more HARQ process identifiers to identify the specified second UE as a receiver UE for the sidelink. The above systems, methods, and apparatuses may include the associating the one or more HARQ process identifiers with the specified second UE leaving at least one HARQ process identifier unassociated with any particular sidelink receiver UE. The above systems, methods, and apparatuses may include scrambling a CRC of the DCI based at least in part on an identifier corresponding to the specified second UE. The above systems, methods, and apparatuses may include the scheduling being with respect to a DG, and the scrambling the CRC of the DCI including scrambling the CRC using a sidelink-transmitter UE-receiver UE-radio network temporary identifier (SL-TX-RX-RNTI) corresponding to the first UE and the specified second UE. The above systems, methods, and apparatuses may include distributing the SL-TX-RX-RNTI to the first UE via RRC signaling. The above systems, methods, and apparatuses may include the scheduling being with respect to a CG, and scrambling the CRC of the DCI including scrambling the CRC using a sidelink-configured scheduling-transmitter UE-receiver UE-radio network temporary identifier (SL-CS-TX-RX-RNTI) corresponding to the first UE and the specified second UE. The above systems, methods, and apparatuses may include distributing the SL-CS-TX-RX-RNTI to the first UE via RRC signaling.

The above systems, methods, and apparatuses may include the scheduling being with respect to a CG, and the control signaling including RRC signaling. The above systems, methods, and apparatuses may include configuring the first UE for the sidelink via the RRC signaling using an identification of the specified second UE.

In one aspect of the disclosure, a method of wireless communication is provided. The method may include receiving control signaling scheduling resources for a sidelink between a first UE and a specified second UE. The first UE may be in communication with a base station and may be a UE to transmit to the specified second UE via the sidelink. The control signaling may be configured to identify the specified second UE. The method may also include implementing, based on the control signaling, the sidelink between the first UE and the specified second UE in accordance with the scheduling.

In an additional aspect of the disclosure, an apparatus configured for wireless communication is provided. The apparatus may include means for receiving control signaling scheduling resources for a sidelink between a first UE and a specified second UE. The first UE may be in communication with a base station and may be a UE to transmit to the specified second UE via the sidelink. The control signaling may be configured to identify the specified second UE. The apparatus may also include means for implementing, based on the control signaling, the sidelink between the first UE and the specified second UE in accordance with the scheduling.

In an additional aspect of the disclosure, a non-transitory computer-readable medium having program code recorded thereon for wireless communication is provided. The program code may include code to receive control signaling scheduling resources for a sidelink between a first UE and a specified second UE. The first UE may be in communication with a base station and may be a UE to transmit to the specified second UE via the sidelink. The control signaling may be configured to identify the specified second UE. The program code may also include code to implement, based on the control signaling, the sidelink between the first UE and the specified second UE in accordance with the scheduling.

In an additional aspect of the disclosure, an apparatus configured for wireless communication is provided. The apparatus includes at least one processor, and a memory coupled to the processor. The processor may be configured to receive control signaling scheduling resources for a sidelink between a first UE and a specified second UE. The first UE may be in communication with a base station and may be a UE to transmit to the specified second UE via the sidelink. The control signaling may be configured to identify the specified second UE. The processor may also be configured to implement, based on the control signaling, the sidelink between the first UE and the specified second UE in accordance with the scheduling.

In accordance with aspects of the disclosure, the foregoing systems, methods, and apparatuses may be implemented in combination with one or more additional features, such as the following features whether alone or in combination. For example, the above systems, methods, and apparatuses may include the control signaling including DCI. The above systems, methods, and apparatuses may include the DCI being according to DCI format 3_0. The above systems, methods, and apparatuses may include the first UE operating under control of the base station to implement resources allocated to the sidelink between the first UE and the specified second UE as designated by the DCI. The above systems, methods, and apparatuses may include providing, via a PUCCH, an ACK/NACK configured for the base station determining if additional resource allocation is to be provided for the sidelink between the first UE and the specified second UE. The above systems, methods, and apparatuses may include the DCI being configured to carry a sidelink receiver UE indicator. The above systems, methods, and apparatuses may include a field being included in the DCI to carry the sidelink receiver UE indicator. The above systems, methods, and apparatuses may include a field of the DCI being repurposed to carry the sidelink receiver UE indicator. The above systems, methods, and apparatuses may include the sidelink receiver UE indicator including an index value corresponding to the specified second UE to indicate the specified second UE as a receiver UE for the sidelink. The above systems, methods, and apparatuses may include receiving a mapping from an identification of the specified second UE to the index value via RRC signaling. The above systems, methods, and apparatuses may include the scheduling being with respect to a DG, and a CRC of the DCI being scrambled using a sidelink-radio network temporary identifier (SL-RNTI) corresponding to the first UE. The above systems, methods, and apparatuses may include the scheduling being with respect to a CG, and a CRC of the DCI being scrambled using a SL-CS-RNTI corresponding to the first UE. The above systems, methods, and apparatuses may include one or more HARQ process identifiers being associated with the specified second UE, and the DCI carrying the one or more HARQ process identifiers to identify the specified second UE as a receiver UE for the sidelink. The above systems, methods, and apparatuses may include at least one HARQ process identifier remaining unassociated with any particular sidelink receiver UE. The above systems, methods, and apparatuses may include a CRC of the DCI being scrambled based at least in part on an identifier corresponding to the specified second UE. The above systems, methods, and apparatuses may include the scheduling being with respect to a DG, and the CRC being scrambled using a SL-TX-RX-RNTI corresponding to the first UE and the specified second UE. The above systems, methods, and apparatuses may include receiving the SL-TX-RX-RNTI via radio resource control (RRC) signaling. The above systems, methods, and apparatuses may include the scheduling being with respect to a CG, and the CRC being scrambled using a SL-CS-TX-RX-RNTI corresponding to the first UE and the specified second UE. The above systems, methods, and apparatuses may include receiving the SL-CS-TX-RX-RNTI via RRC signaling. The above systems, methods, and apparatuses may include the scheduling being with respect to a CG, and the control signaling including RRC signaling. The above systems, methods, and apparatuses may include receiving an identification of the specified second UE via the RRC signaling for configuring the first UE for the sidelink.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
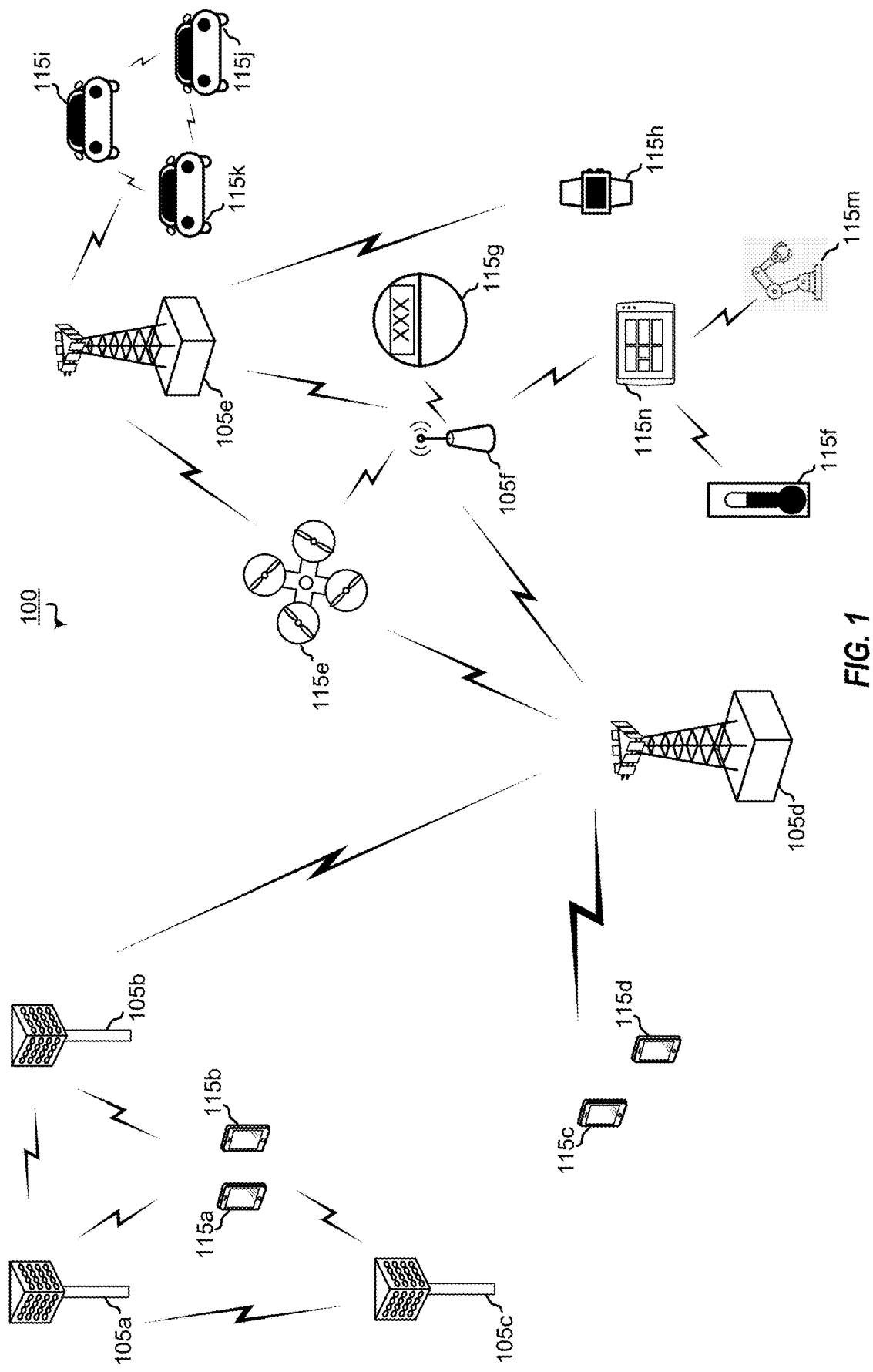
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3$^{rd}$ Generation Partnership Project" (3GPP), and cdma2000 is described in documents from an organization named "3$^{rd}$ Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of Things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105$d$ and 105$e$ are regular macro base stations, while base stations 105$a$-105$c$ are macro base stations enabled with one of 3 dimension (3D), full dimension (FD), or massive MIMO. Base stations 105$a$-105$c$ take advantage of their higher dimension MIMO capabilities to exploit 3D beamforming in both elevation and azimuth beamforming to increase coverage and capacity. Base station 105$f$ is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of Things" (IoT) or "Internet of Everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), UE 115h (wearable device), UE 115m (robotic actuator), and UE 115n (industrial controller) may communicate through wireless network 100 either directly with base stations, such as small cell base station 105f, and macro base station 105e, or in multi-hop configurations by communicating with another user device which relays its information to the network, such as UE 115f communicating temperature measurement information to the industrial controller, UE 115n, which may utilize the data and/or report the data to the network (e.g., for transmission to another device, such as another industrial controller) through small cell base station 105f. Wireless network 100 may also provide additional network efficiency through dynamic, low-latency TDD/FDD communications, such as in a vehicle-to-vehicle (V2V) or vehicle-to-everything (V2X) mesh network between UEs 115i-115k communicating with macro base station 105e.

Figure 2:
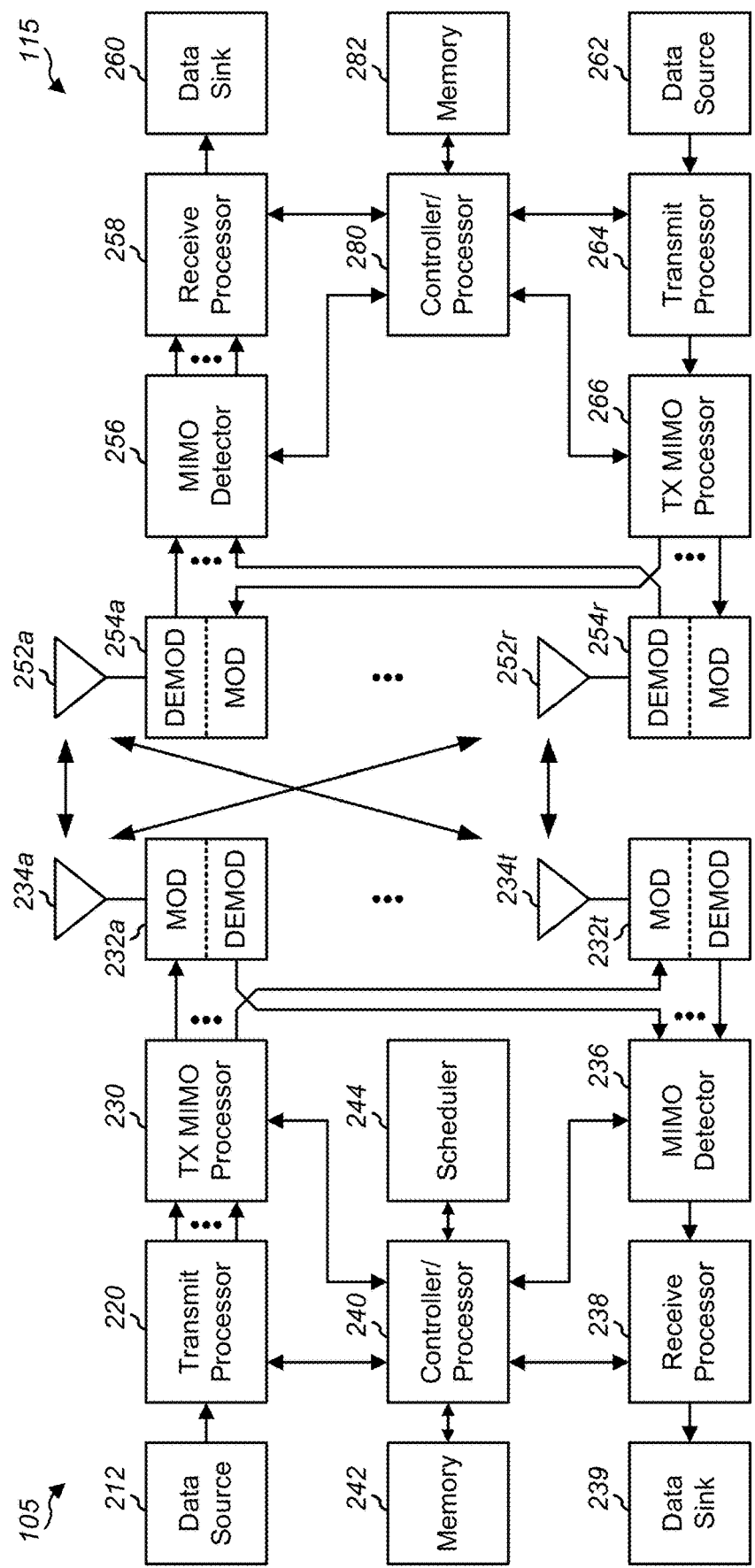
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 6 and 7, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In an example implementation of wireless network 100, one or more of UEs 115 may comprise various forms of IoT devices, such as industrial Internet of things (IIoT) devices, in communication via wireless links of wireless network 100. For example, the IIoT devices of some deployments may comprise sensors (e.g., position sensors, temperature sensors, pressure sensors, power sensors, motion detectors, proximity detectors, accelerometers, scanners, cameras, probes, switches, etc.) and/or actuators (e.g., linear actuators, rotary actuators, servomechanisms, solenoids, stepper motors, electric motors, comb drive actuators, etc.). A large number of IIoT devices may be in communication with a corresponding device, such as an industrial controller (e.g., computer, programmable logic controller (PLC), supervisory control and data acquisition (SCADA) system, etc.), of a control network in an industrial environment, such as a manufacturing facility, materials processing facility, warehouse, etc. For example, a PLC may be in communication with 20-50 sensors and/or actuators, wherein 100-1000 such PLCs may be deployed throughout an industrial (e.g., manufacturing) facility.

Figure 3:
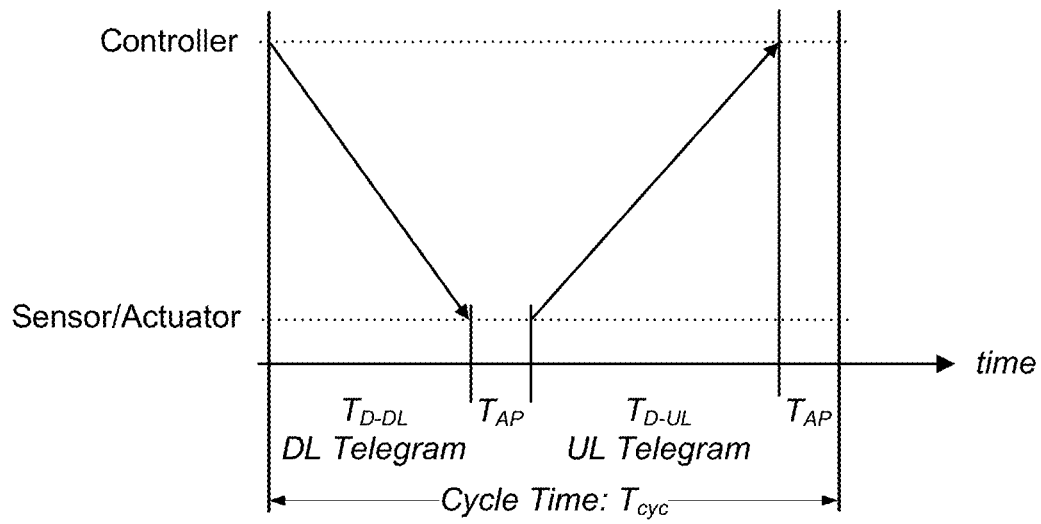
FIG. 3 is a diagram illustrating the deterministic and periodic nature of industrial Internet of things (IIoT) traffic.

The various IIoT devices of an industrial environment control network may periodically communicate information (e.g., measurements, state information, command acknowledgments, etc.) to and/or receive information (e.g., commands, parameters, settings, state information, etc.) from an associated industrial controller. For example, cyclic exchanges may be performed between an industrial controller and a large number of IIoT devices of a control network. Accordingly, the IIoT traffic may be deterministic and periodic, as represented in the diagram of FIG. 3.

Latency and reliability requirements for IIoT traffic are often stringent since output results typically must be produced in response to input conditions within a limited time to avoid unintended, and even dangerous, operation of an industrial process. For example, latency requirements of IIoT traffic may be on the order of 1-2 ms and the reliability requirements may be on the order of 10-5-10-6 block error rate (BLER). Accordingly, both data and control channels of an industrial environment control network may be designed to meet these overall requirements.

Control networks in industrial environments have traditionally utilized wireline communication links. For example, IIoT devices may be in communication with a corresponding industrial controller using wired network links, such as 100 base T Ethernet links. Such a control network may be quite complicated with respect to establishing and maintaining the network links, reconfiguring the network, etc. For example, the task of reconfiguring a control network including a large number of IIoT devices deployed on a factory floor can be costly in both time and expense.

There is interest in making industrial environment control network connectivity wireless. Industrial environment control networks utilizing wireless links may, for example, reduce the time and expense required for reconfiguration of the control network on the factory floor. However, establishing and maintaining reliable wireless links between an industrial controller and the IIoT devices associated therewith can be problematic. For example, the industrial controllers are generally located close to machinery which may cause issues (e.g., shadowing, electrical noise, etc.) in maintaining a reliable and adequate communication link with ones of the many IIoT devices of the control network. Moreover, the latency and reliability requirements for IIoT traffic can prove challenging to meet in a wireless control network implementation.

In accordance with aspects of the present disclosure, one or more base stations are utilized in an industrial environment control network, such as for aiding in multi-hop communication links between industrial controllers and/or respective IIoT devices of the control network. For example, one or more base stations 105 of wireless network 100 may be ceiling-mounted, or otherwise disposed (e.g., wall-mounted, mounted atop a pole other structure, etc.), to provide a substantially unobstructed path to one or more industrial controllers, some or all IIoT devices of a control network, etc. The example of FIG. 4 shows a portion of wireless network 100 forming industrial environment control network 400 in which base station 105f (e.g., small cell base station) is disposed to aid with respect to communication links with respect to multiple UEs (shown as UEs 115f, 115m, and 115n) of the control network.

Figure 4:
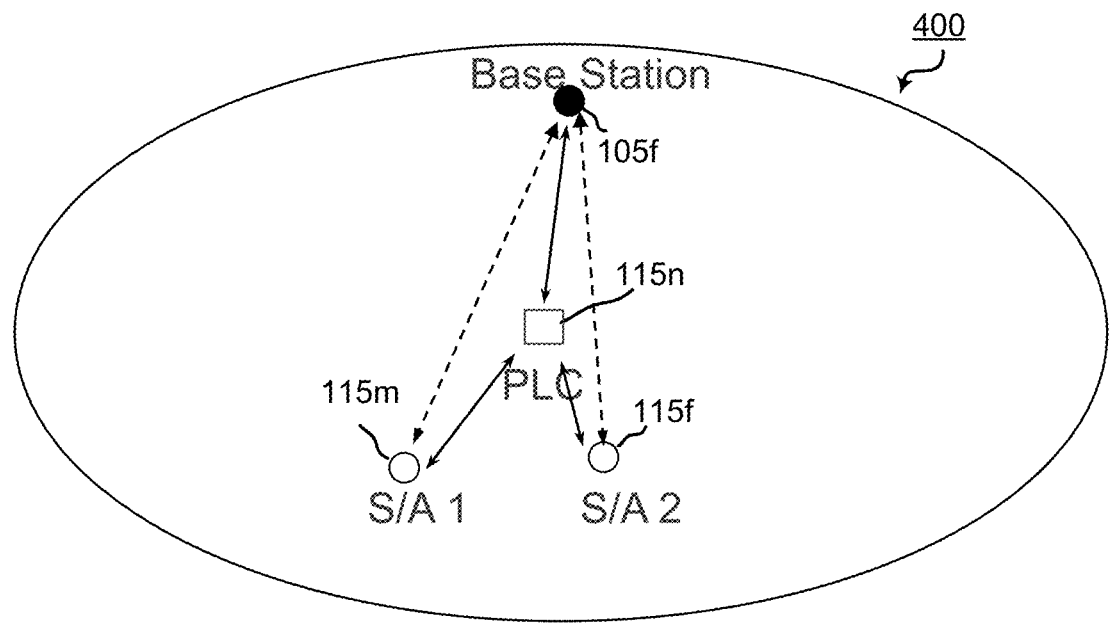
FIG. 4 is a portion of a wireless network forming an industrial environment control network according to some embodiments of the present disclosure.

Although an example of FIG. 4 is described as an industrial environment control network 400 in which UE 105f comprises a small cell configuration, UE 115n comprises a PLC configuration, UE 115f comprises a thermometer sensor configuration, and UE 115m comprises a robotic actuator configuration, this example configuration is merely illustrative of a control network in which concepts of the present invention may be applied. It should be appreciated that a control network may comprise various configurations of both base stations (e.g., macro cells, small cells, etc., or combinations thereof), industrial controller UEs, (e.g., computers, PLCs, SCADAs, etc., or combinations thereof), and/or IIoT devices (e.g., position sensors, temperature sensors, pressure sensors, power sensors, motion detectors, proximity detectors, accelerometers, scanners, cameras, probes, switches, linear actuators, rotary actuators, servomechanism, solenoid, stepper motor, electric motor, comb drive actuators, etc., or combinations thereof). Moreover, although the example of FIG. 4 illustrates a single instance of a base station, a single instance of an industrial controller, and two instances of IIoT devices for simplicity, a control environment in which concepts of the present invention may be implemented may comprise different numbers of any or all of the foregoing (e.g., multiple base stations, multiple industrial controllers, and IIoT devices on the order of tens, hundreds, or even thousands).

In the example of FIG. 4, UE 115n may comprise a PLC or other industrial controller providing control functionality with respect to a plurality of sensor and actuator IIoT devices (shown as including UEs 115f and 115m designated as sensor/actuator (S/A) 1 and S/A 2). UE 115n may communicate directly with base station 105f, such as using a UE to UMTS (Uu) interface. UE 115n (e.g., industrial controller) may implement sidelinks (i.e., communication links directly between UEs) with respect to UEs 115f (e.g., thermometer) and 115m (e.g., robotic actuator), such as using a UE to UE interface (e.g., a PC5 interface of a V2X mesh network). Multi-hop communication may be provided between UEs 115m and 115f and base station 105f via UE 115n. Base station 105f may additionally or alternatively establish direct communication links with various ones of the IIoT devices of a control network (e.g., UE 115f, UE 115m, etc.), such as using a Uu interface.

Existing V2X interface protocols provide for dynamic and configured grants for sidelinks (e.g., a physical sidelink control channel (PSCCH) and/or physical sidelink shared channel) using a PC5 interface. A dynamic grant (DG) may provide a one-time grant of sidelink resources, such as responsive to instantaneous demand/need for sidelink communication. A configured grant (CG) may provide a grant of sidelink resources enabling continued/periodic/repeated sidelink communication. A first type of sidelink resource grant (Type 1) of the V2X interface protocols uses radio resource control (RRC) to configure a UE with resources of a CG. A second type of sidelink resource grant (Type 2) of the V2X interface protocols uses downlink control information (DCI) over a PDCCH to configure a UE with resources of a DG or a CG. For example, the DCI may be a DG and provide allocation of resources to be used for sidelink communication. Alternatively, the DCI may be a CG and activate/deactivate a CG for sidelink communication.

Figure 5:
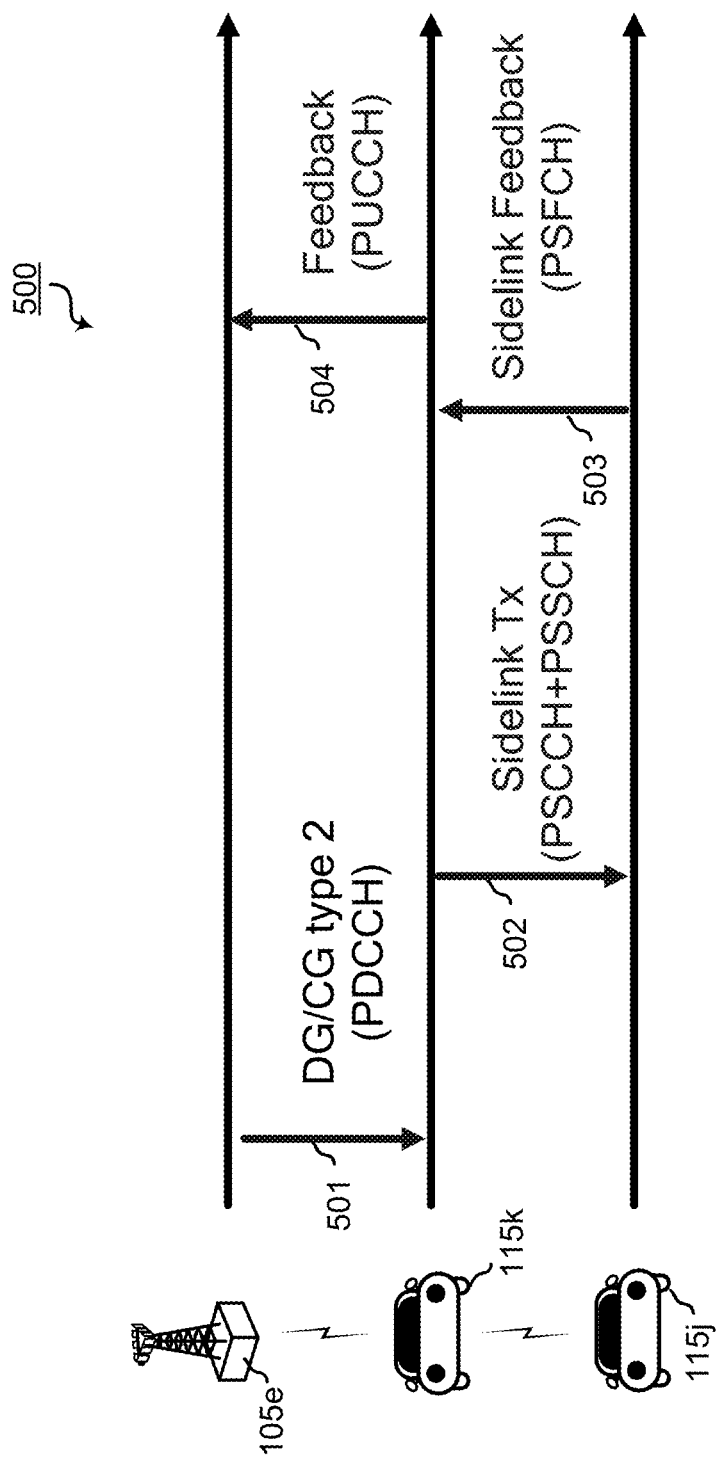
FIG. 5 is a physical-layer procedure flow for sidelink resource grants in accordance with V2X interface DG/CG Type 2 protocols.

FIG. 5 illustrates a physical-layer procedure flow (procedure flow 500) for sidelink resource grants in accordance with the above mentioned V2X interface DG/CG Type 2 protocols. Procedure flow 500 of FIG. 5 is described with reference to a V2X mesh network between UEs 115j and 115k communicating with macro base station 105e, as shown in wireless network 100 of FIG. 1. It should be understood, however, that the procedure flow may be implemented with respect to various UEs and UE configurations.

In procedure flow 500 of FIG. 5, base station 105e uses DCI, provided according to DCI format 3_0 and which is configured to correspond to UE 115k (e.g., sidelink transmitter (TX) UE), to deliver a DG/CG Type 2 to UE 115k at procedure 501. DCI format 3_0 provides fields for time gap, hybrid automatic repeat request (HARQ) process identification, new data indicator, lowest index of the subchannel allocation to the initial transmission, first-stage sidelink control information (SCI) format 0-1 fields (including frequency resource assignment and time resource assignment), physical sidelink feedback channel (PSFCH) to HARQ feedback timing indicator, and PUCCH resource indicator, as well as configuration index in the case of CG. Base station 105e prepares the DCI with a sidelink-radio network temporary identifier (SL-RNTI) for UE 115, in the case of DG, or sidelink-configured scheduling-radio network temporary identifier (SL-CS-RNTI) for UE 115k, in the case of CG, to configure the DCI to correspond to UE 115k. In particular, the cyclic redundancy check (CRC) of the DCI is scrambled by SL-RNTI or SL-CS-RNTI for UE 115K in order to deliver a DG/CG Type 2 to the UE (e.g., sidelink TX UE).

In the case of CG, UE 115k (e.g., sidelink TX UE) reports the activation (or deactivation) of a sidelink (not shown in procedure flow 500). In particular, activation/deactivation of a CG sidelink is reported through media access control-control element (MAC-CE). MAC-CE reporting is also used by UE 115k to provide sidelink buffer status reports (BSRs) to base station 105e. For example, UE 115k may have provided a BSR indicating data for sidelink communication is contained in the UE buffer, resulting in base station 115e initiating the sidelink resource grant of procedure 501.

At procedure 502 of procedure flow 500, UE 115k (e.g., sidelink TX UE) uses SCI, provided according to SCI format 0-1 (e.g., for scheduling physical sidelink shared channel (PSSCH) and second-stage SCI on PSSCH) and SCI format 0-2 (e.g., for decoding PSSCH) to schedule PSSCH and transmits data through PSSCH to UE 115j (e.g., sidelink receiver (RX) UE) according to the DG/CG Type 2 (sidelink resource grant of procedure 501). SCI format 0-1 provides fields for priority, frequency resource assignment, time resource assignment, resource reservation period, demodulation reference signal (DMRS) pattern, second-stage SCI format (broadcast, unicast, groupcast), Beta_offset indicator, number of DMRS port, modulation and coding scheme (MCS), and a reserved field. SCI format 0-2 provides fields for HARQ process identification, new data indicator, redundancy version, source identification, destination identification, and channel state information (CSI) request, also if the second-stage SCI format field in the corresponding SCI provided in SCI format 0-1 indicates type 1 groupcast zone identification and communication range requirement fields are present. MCS selection is up to the sidelink TX UE (e.g., UE 115k in procedure flow 500), within limits set by the base station (e.g., base station 105e).

It can be seen from the foregoing that the base station schedules node resources for the sidelink TX UE (procedure 501) and the sidelink TX UE implements one or more sidelinks with sidelink RX UEs using some or all of the scheduled resources (procedure 502). However, the base station does not control how the sidelink TX UE uses the resources and which UEs are selected as the sidelink RX UEs by the sidelink TX UE. The existing V2X protocols do not enable a base station making a sidelink resource grant to a sidelink TX UE to schedule sidelink resources for a specific sidelink (e.g., a sidelink between that sidelink TX UE and a specified sidelink RX UE).

Continuing with procedure flow 500 of FIG. 5, UE 115j (e.g., sidelink RX UE) provides sidelink feedback to UE 115k (e.g., sidelink TX UE) at procedure 503. In particular, UE 115j sends ACK/NACK on PSFCH upon receiving each transmission according to DG/CG Type 2.

At procedure 504 of procedure flow 500, UE 115k (e.g., sidelink TX UE) forwards the sidelink feedback provided by UE 115j (e.g., sidelink RX UE) to base station 105e. In particular, UE 115k forwards the ACK/NACK received from UE 115j to base station 105e on PUCCH.

As discussed above with reference to FIG. 3, IIoT traffic exchanged between an industrial controller and its corresponding IIoT devices is typically deterministic and periodic. Also as discussed above, low latency communication is expected with respect to the IIoT traffic. Accordingly, V2X protocols implementing DG/CG of sidelink resources may be used with respect to IIoT traffic between an IIoT device and a corresponding industrial controller in an attempt to enable low-latency communications. However, although a base station may utilize V2X protocols to schedule resources for a first UE (e.g., sidelink TX UE, such as UE 115k) to implement a sidelink with one or more other UEs (e.g., sidelink RX UEs, such as UE 115j), the base station does not control how the first UE (e.g., sidelink TX UE) uses the resources and which other UEs comprise the second UEs (e.g., sidelink RX UEs). That is, a base station using existing V2X interface protocols to provide sidelink resource grants (e.g., DGs or CGs) cannot schedule resources for a specific sidelink (e.g., schedule resources for a sidelink between a sidelink TX UE and a specified RX UE). For example, SL-RNTI and SL-CS-RNTI used in respective DG and CG Type 2 are source-node (e.g., sidelink TX UE) specific in the current PC5 interface. The DCI whose CRC is scrambled by SL-RNTI or SL-CS-RNTI is sent to the sidelink TX UE only.

In accordance with aspects of the present disclosure, a base station is enabled to schedule link resources, rather than node resources, with respect to sidelinks. For example, a base station may schedule resources for a sidelink between a first UE (e.g., sidelink TX UE) in communication with a base station and a specified second UE (e.g., sidelink RX UE) in communication with the first UE. A base station may schedule resources for a specific sidelink via DCI, using DCI format 3_0 or a hybrid thereof, such as to provide DG and CG Type 2. According to some aspects of the disclosure, unlike operation according to existing V2X protocols, a sidelink TX UE may be denied the freedom to assign the granted resources to an arbitrary sidelink it controls. Instead, a sidelink TX UE of embodiments follows the base station instruction indicated in the sidelink resource grant (e.g., DCI) to allocate the resources to the corresponding sidelink (e.g., sidelink between the sidelink TX UE and a specified sidelink RX UE). Such specific sidelink scheduling of resources may be used to control, reduce, minimize, etc. link-level interferences such as inter-cell interference and cross-link interference introduced by sidelinks. For example, a base station may fully control the resources allocated to a specific sidelink to enhance reliability through minimizing link-level interferences. Additionally, in accordance with some aspects of the disclosure, a base station may use an ACK/NACK, forwarded by a sidelink TX UE from a sidelink RX UE on PUCCH, to determine if additional resource allocation is needed or otherwise advantageous for a specific sidelink. For example, a base station may determine if additional resource allocation is to be provided for the sidelink between the first UE and the specified second UE based at least in part on an ACK/NACK received from the first UE (e.g., via PUCCH) in light of the ACK/NACK corresponding to a specific sidelink (e.g., a sidelink between the first UE and the specified second UE).

A first UE that is in communication with a base station is referred to as a sidelink TX UE in light of that UE initially establishing the sidelink, such as by transmitting SCI and/or other information to the second UE of the sidelink. Correspondingly, a specified second UE that is in communication with the first UE via a sidelink is referred to as a sidelink RX UE in light of that UE initially receiving SCI and/or other information transmitted by the first UE of the sidelink. It should be appreciated, however, that UEs communicating via a sidelink implemented in accordance with aspects of the present disclosure are not restricted or otherwise limited to the foregoing designated transmitter or receiver roles. For example, bidirectional communication may be implemented between a first UE and a specified second UE of a particular sidelink. Moreover, the specified second UE may operate to primarily transmit via the sidelink, while the first UE may operate to primarily receive via the sidelink, in some scenarios.

It should be appreciated that a grant with respect to sidelink resources identifying a specified second UE according to some embodiments of the disclosure may identify one or more second UEs. For example, a plurality of second UEs may be specified using destination identification for a group of UEs forming the plurality of second UEs. Additionally or alternatively, a plurality of second UEs may be specified using destination identification information for each such UE.

Figures 6, 7:
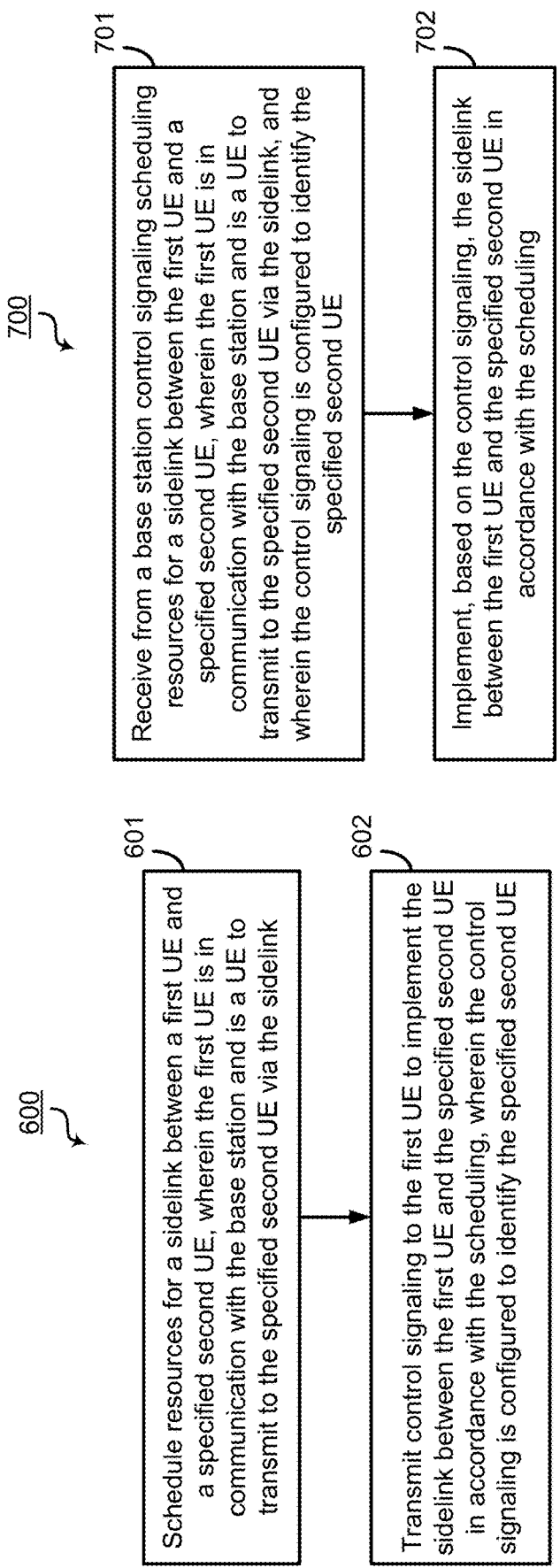
FIGS. 6 and 7 are flow diagrams of operation providing scheduling of resources for a sidelink between a first UE in communication with a base station and a specified second UE in communication with the first UE according to embodiments of the present disclosure.

FIGS. 6 and 7 show operation providing scheduling of resources for a sidelink between a first UE in communication with a base station and a specified second UE in communication with the first UE according to some embodiments of the present disclosure. In particular, flow 600 of FIG. 6 illustrates operation by a base station with respect to scheduling resources for UE sidelink communication in accordance with aspects of the disclosure. Flow 700 of FIG. 7 illustrates operation by a UE (e.g., sidelink TX UE) with respect to scheduling resources for UE sidelink communication in accordance with aspects of the disclosure.

Referring first to the base station operation of flow 600 of FIG. 6, at block 601, a base station schedules resources for a sidelink between a first UE and a specified second UE. In accordance with embodiments, the first UE (e.g., sidelink TX UE) is in communication with the base station and is a UE to transmit to the specified second UE (e.g., specified sidelink RX UE) via the sidelink. Sidelink scheduling logic (e.g., logic implemented by program code, as may be stored in one or more memories such as memory 242, executed by one or more controller/processors, such as controller/processor 240) of a base station (e.g., base station 105f of FIG. 1) may analyze various aspects (e.g., UE locations/relative positions, frequency resources being used, timing resources being used, CSI, buffer states, retransmission metrics, interference, transmission power levels, receive signal strength information, etc.) to determine one or more aspects (e.g., frequency resource assignment, time resource assignment, etc.) of scheduling with respect to a sidelink between the first UE (e.g., UE 115n) and the specified second UE (e.g., a specific one of UEs 115f and 115m). Such analysis may, for example, identify sidelink resources suitable for scheduling with respect to the sidelink in order to control, reduce, minimize, etc. link-level interferences (e.g., inter-cell interference and/or cross-link interference) introduced by the sidelink.

At block 602 of flow 600, the base station transmits control signaling to the first UE to implement the sidelink between the first UE and the specified second UE in accordance with the scheduling. For example, wireless communication resources (e.g., one or more wireless radios, such as may comprise modulator/demodulators 232a-t, MIMO detector 236, receive processor 238, transmit processor 220, and TX MIMO processor 230, operating under control of one or more controller/processors, such as controller/processor 240 executing sidelink scheduling logic) of a base station (e.g., base station 105f) may be utilized to transmit sidelink scheduling control signaling (e.g., comprising DCI and/or RRC signaling) configured to provide scheduling of resources for a sidelink between the first UE the specified second UE. In accordance with aspects of the disclosure, the control signaling is configured to identify the specified second UE. For example, a base station (e.g., base station 105f of FIG. 1) may schedule resources for a specific sidelink by providing control signaling for implementing the sidelink between the first UE (e.g., UE 115n) and the specified second UE (e.g., a specific one of UEs 115f and 115m) that is configured to identify or otherwise specify the second UE.

In a scenario where the sidelink resource grant is in accordance with a DG Type 2 or a CG Type 2, the control signaling may comprise DCI. For example, the DCI may be provided according to DCI format 3_0 or a hybrid thereof (e.g., configured to carry a sidelink receiver UE indicator, repurposing one or more fields, etc.).

In accordance with some aspects of the disclosure, DCI used with respect to scheduling a sidelink between a first UE and a specified second UE may carry destination identification for the specified second UE (e.g., the DCI carries a sidelink RX UE indicator). For example, a field may be added in the payload of DCI format 3_0 to include destination identification identifying the specified second UE for a sidelink. Additionally or alternatively, a field of the DCI may be repurposed to carry the sidelink receiver UE indicator (e.g., the configuration index field provided for CG Type 2 may be repurposed as a destination identification field for DG Type 2 and/or for CG Type 2). The destination identification may, for example, comprise actual or full destination identification information (e.g., obtained from a destination identification database available to the base station) for a specified second UE for a sidelink. In accordance with some embodiments, the destination identification may be provided in the form of an index value (e.g., an index value mapped to actual or full destination identification information, as may be stored as part of a destination identification database) corresponding to the specified second UE to indicate the specified second UE as a receiver UE for the sidelink. A base station (e.g., base station 105f) may, for example, configure one or more UEs (e.g., UEs 115f, 115m, 115n, etc.) with a mapping from an identification of specific UEs (e.g., putative specified second UEs) to corresponding index values via RRC signaling, such as when the UE joins wireless network 100, when the UE establishes a link with the base station, when a sidelink communication feature is enabled with respect to the UE, etc.

Embodiments utilizing destination identification carried by a field added to or repurposed in the DCI format may prepare the DCI with RNTI corresponding to the first UE (e.g., sidelink TX UE). For example, in a case in which the scheduling is with respect to a DG, the CRC of the DCI may be scrambled using a SL-RNTI corresponding to the first UE. In a case in which the scheduling is with respect to a CG, the CRC of the DCI may be scrambled using a SL-CS-RNTI corresponding to the first UE.

In accordance with some aspects of the disclosure, one or more HARQ process identifiers may additionally or alternatively be associated with specific UEs (e.g., putative specified second UEs, wherein associations between HARQ process identifiers and corresponding UEs may be stored in a destination identification database available to the base station). For example, HARQ process identifiers 0-3 may be assigned to or otherwise associated with UE1 (e.g., UE 115f), HARQ process identifiers 4-7 may be assigned to or otherwise associated with UE2 (e.g., UE 115m), etc. Some HARQ process identifiers may be left for general purpose (e.g., unassigned or otherwise associated with specific UEs) use, such as for use with respect to communications which the base station does not control. DCI used with respect to scheduling a sidelink between a first UE and a specified second UE may carry the one or more HARQ process identifiers to identify the specified second UE as a receiver UE for the sidelink (e.g., the DCI carries HARQ process identifiers providing a sidelink RX UE indicator).

Embodiments utilizing destination identification carried by HARQ process identifiers associated with a sidelink RX UE may prepare the DCI with RNTI corresponding to the first UE (e.g., sidelink TX UE). For example, in a case in which the scheduling is with respect to a DG, the CRC of the DCI may be scrambled using a SL-RNTI corresponding to the first UE. In a case in which the scheduling is with respect to a CG, the CRC of the DCI may be scrambled using a SL-CS-RNTI corresponding to the first UE.

In accordance with some aspects of the disclosure, a CRC of the DCI may be scrambled based at least in part on destination identification (e.g., obtained from a destination identification database available to the base station) corresponding to the specified second UE (e.g., the DCI carries CRC providing a sidelink RX UE indicator). For example, the destination identification may essentially be carried in RNTI used for DCI. In a case in which the scheduling is with respect to a DG, the CRC may be scrambled using a sidelink-transmitter UE-receiver UE-radio network temporary identifier (SL-TX-RX-RNTI) corresponding to the first UE (e.g., sidelink TX UE, such as UE 115*n*) and the specified second UE (e.g., sidelink RX UE, such as UE 115*f* or UE 115*m*). In a case in which the scheduling is with respect to a CG, the CRC may be scrambled using a sidelink-configured scheduling-transmitter UE-receiver UE-radio network temporary identifier (SL-CS-TX-RX-RNTI) corresponding to the first UE (e.g., sidelink TX UE, such as UE 115*n*) and the specified second UE (e.g., sidelink RX UE, such as UE 115*f* or UE 115*m*). Accordingly, a base station may use DCI provided in a DCI format 3_0 whose CRC is scrambled by SL-TX-RX-RNTI or SL-CS-TX-RX-RNTI to grant a sidelink TX UE resources for the sidelink specified by the RNTI. A base station (e.g., base station 105*f*) may distribute RNTI corresponding to a sidelink RX UE (e.g., SL-TX-RX-RNTI and/or SL-CS-TX-RX-RNTI) to a sidelink TX UE via RRC signaling, such as when the UE joins wireless network 100, when the UE establishes a link with the base station, when a sidelink communication feature is enabled with respect to the UE, etc. In accordance with aspects of the disclosure, a base station may distribute N SL-TX-RX-RNTI and/or N SL-CS-TX-RX-RNTI to each sidelink TX UE with N sidelink RX UEs.

In a scenario where the sidelink resource grant is in accordance with a CG Type 1, the control signaling may comprise RRC. In operation according to CG Type 1, DCI provided according to DCI format 3_0 is not used, and instead sidelink resources are automatically activated when configured. Embodiments scheduling resources for a sidelink between a first UE and a specified second UE may implement RRC signaling using destination identification for the specified second UE. For example, a base station (e.g., base station 105*f*) may provide RRC signaling to a first UE (e.g., sidelink TX UE, such as UE 115*n*) to configure the first UE for sidelink communication with a specified second UE (e.g., sidelink RX UE, such as UE 115*f* or 115*m*). The destination identification (e.g., obtained from a destination identification database available to the base station) may, for example, comprise actual or full destination identification information for a specified second UE for a sidelink. In accordance with some embodiments, the destination identification may be provided in the form of an index value (e.g., an index value mapped to actual or full destination identification information) corresponding to the specified second UE to indicate the specified second UE as a receiver UE for the sidelink. A base station (e.g., base station 105*f*) may, for example, configure one or more UEs (e.g., UEs 115*f,* 115*m,* 115*n,* etc.) with a mapping from an identification of specific UEs (e.g., putative specified second UEs) to corresponding index values via RRC signaling, such as when the UE joins wireless network 100, when the UE establishes a link with the base station, when a sidelink communication feature is enabled with respect to the UE, etc.

Referring now to the UE operation of flow 700 of FIG. 7, at block 701, a first UE receives from a base station control signaling scheduling resources for a sidelink between the first UE and a specified second UE. For example, wireless communication resources (e.g., one or more wireless radios, such as may comprise modulator/demodulators 254*a-r*, MIMO detector 256, receive processor 258, transmit processor 264, and TX MIMO processor 266, operating under control of one or more controller/processors, such as controller/processor 280 executing sidelink scheduling logic) of a UE (e.g., UE 115*n*) may be utilized to receive sidelink scheduling control signaling (e.g., comprising DCI and/or RRC signaling) configured to provide scheduling of resources for a sidelink between the first UE the specified second UE. The first UE (e.g., sidelink TX UE), which is in communication with the base station, may be a UE to transmit to the specified second UE (e.g., sidelink RX UE) via the sidelink. In accordance with aspects of the disclosure, the control signaling is configured to identify the specified second UE. For example, the control signaling may be configured (e.g., using a DCI field to carry destination identification, using one or more HARQ process identifiers to provide destination identification, RNTI used for DCI to provide destination identification, or a combination thereof) to identify the specified second UE as described above with respect to flow 600 of FIG. 6.

At block 702 of flow 700, the first UE implements, based on the control signaling, the sidelink between the first UE and the specified second UE in accordance with the scheduling. For example, sidelink scheduling logic (e.g., logic implemented by program code, as may be stored in one or more memories such as memory 282, executed by one or more controller/processors, such as controller/processor 280) of a UE (e.g., sidelink TX UE, such as UE 115*n* of FIG. 1, receiving the sidelink grant) may analyze the sidelink grant to identify a specified second UE (e.g., sidelink RX UE, such as UE 115*f* or UE 115*m*), such as may be indicated by destination identification carried by or otherwise determinable from the control signaling scheduling resources for a sidelink. Additional information available to the first UE, such as information mapping from an identification of specific UEs (e.g., putative specified second UEs) to corresponding index values as may be stored in a destination identification database available to the first UE, may be used in determining destination identification for the specified second UE from the control signaling. The sidelink scheduling logic may additionally determine the particular resources for the sideline between the first UE and the specified second UE from the grant. Thus, the first UE may utilize this information to implement the specific sidelink between the first UE (e.g., sidelink TX UE) and the specified second UE (e.g., sidelink RX UE). For example, UE 115*n* (e.g., sidelink TX UE) may use SCI, provided according to SCI format 0-1 (e.g., for scheduling physical sidelink shared channel (PSSCH) and second-stage SCI on PSSCH) and SCI format 0-2 (e.g., for decoding PSSCH) to schedule PSSCH and transmits data through PSSCH to UE 115*f* or UE 115*m* (e.g., specified second UE, sidelink RX UE) according to the DG/CG Type 2.

Figure 8:
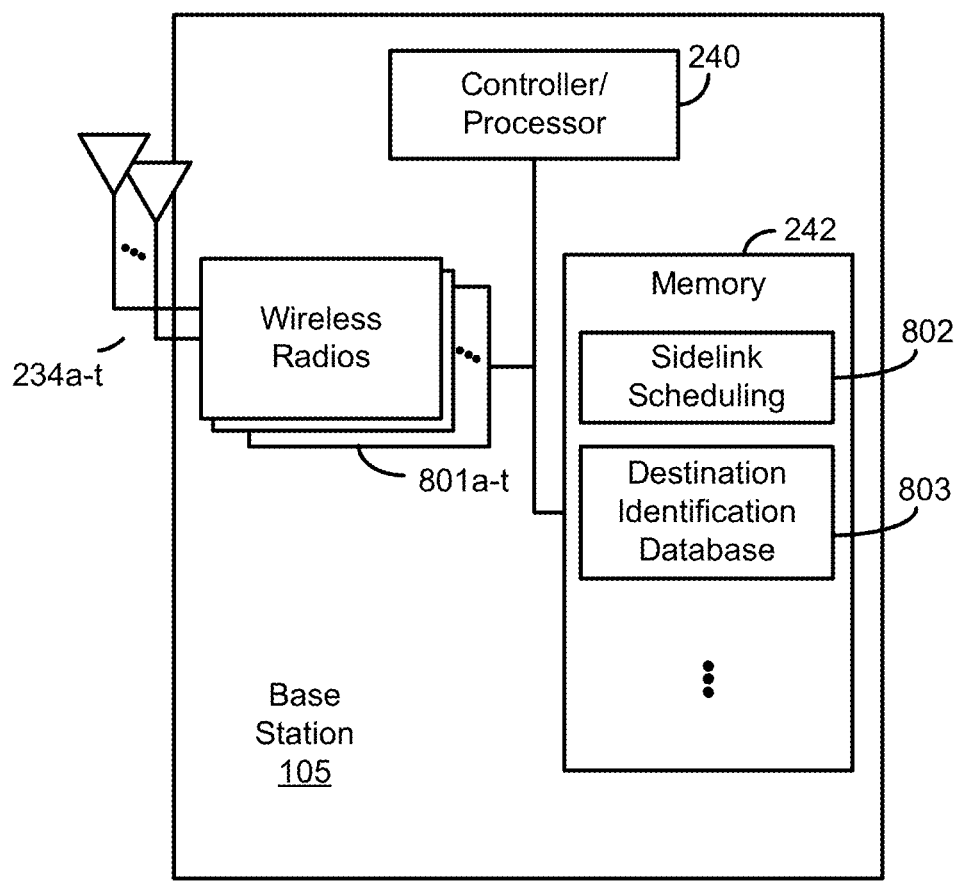
FIG. 8 is a block diagram conceptually illustrating a design of a base station configured to provide scheduling with respect to a sidelink between a first UE and a specified second UE according to some embodiments of the present disclosure.

FIG. 8 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 801*a-t* and antennas 234*a-t*. Wireless radios 801*a-t* include various components and hardware, as illustrated in FIG. 2 for base station 105, including modulator/demodulators 232*a-t*, MIMO detector 236, receive processor 238, transmit processor 220, and TX MIMO processor 230.

Base station 105 of the example shown in FIG. 8 includes sidelink scheduling logic 802 and destination identification database 803 as may be utilized for performing functions as described herein. Sidelink scheduling logic 802 may, for example, comprise program code stored in memory 242 that is executed by controller/processor 240 for providing respective functionality. Sidelink scheduling logic 802 may provide functionality including scheduling resources for a sidelink between a first UE and a specified second UE, controlling transmission of control signaling to the first UE to implement the sidelink between the first UE and the specified second UE, etc., as may utilize destination identification information from destination identification database 803, as described above.

Figure 9:
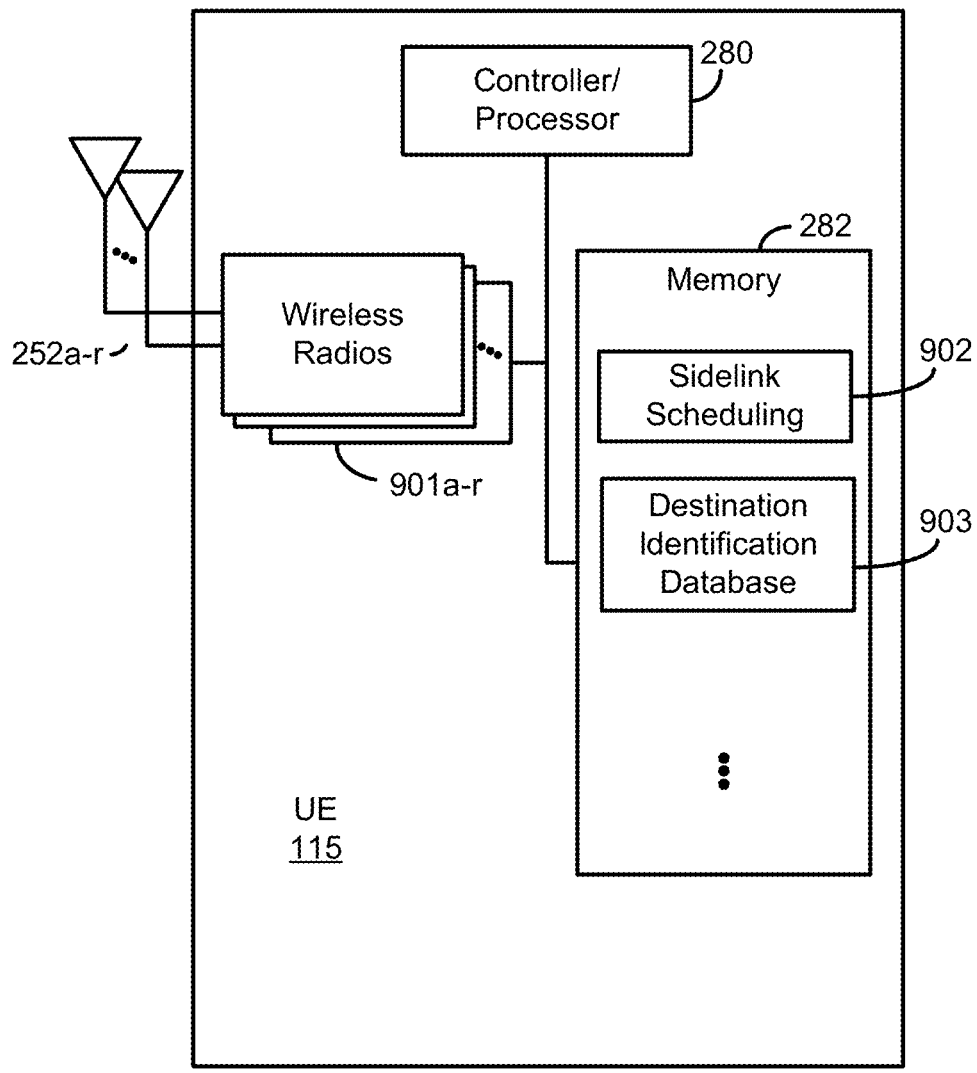
FIG. 9 is a block diagram conceptually illustrating a design of a UE configured to implement scheduling with respect to a sidelink between the UE and a specified second UE according to some embodiments of the present disclosure.

FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 901*a-r* and antennas 252*a-r*. Wireless radios 901*a-r* include various components and hardware, as illustrated in FIG. 2 for UE 115, including modulator/demodulators 254*a-r*, MIMO detector 256, receive processor 258, transmit processor 264, and TX MIMO processor 266.

UE 115 of the example shown in FIG. 9 includes sidelink scheduling logic 902 and destination identification database 903 as may be utilized for performing functions as described herein. Sidelink scheduling logic 802 may, for example, comprise program code stored in memory 282 that is executed by controller/processor 280 for providing respective functionality. Sidelink scheduling logic 902 may provide functionality including controlling receiving control signaling from a base station scheduling resources for a sidelink between the UE and a specified second UE, implementing the sidelink between the UE and the specified second UE based on the control signaling and in accordance with the scheduling, etc., as may utilize destination identification information from destination identification database 903, as described above In some examples of methods, apparatuses, and articles described herein, various aspects of multi-slot transport block techniques may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for scheduling, by a base station, resources for a sidelink between a first UE and a specified second UE, wherein the first UE is in communication with the base station and is a UE to transmit to the specified second UE via the sidelink, and transmitting, by the base station, control signaling to the first UE to implement the sidelink between the first UE and the specified second UE in accordance with the scheduling, wherein the control signaling is configured to identify the specified second UE.

2. The methods, apparatuses, and articles of clause 1, wherein the control signaling comprises DCI.

3. The methods, apparatuses, and articles of clause 2, wherein the DCI is according to DCI format 3_0.

4. The methods, apparatuses, and articles of any of clauses 2-3, further providing for controlling, by the base station, resources allocated to the sidelink between the first UE and the specified second UE using the DCI.

5 The methods, apparatuses, and articles of any of clauses 2-4, further providing for determining, by the base station, if additional resource allocation is to be provided for the sidelink between the first UE and the specified second UE based at least in part on an ACK/NACK received from the first UE via a PUCCH.

6. The methods, apparatuses, and articles of any of clauses 2-5, wherein the DCI is configured to carry a sidelink receiver UE indicator.

7. The methods, apparatuses, and articles of clause 6, wherein a field is included in the DCI to carry the sidelink receiver UE indicator.

9. The methods, apparatuses, and articles of clause 6, wherein a field of the DCI is repurposed to carry the sidelink receiver UE indicator.

10. The methods, apparatuses, and articles of any of clauses 6-9, wherein the sidelink receiver UE indicator comprises an index value corresponding to the specified second UE to indicate the specified second UE as a receiver UE for the sidelink.

11. The methods, apparatuses, and articles of clause 10, further providing for configuring, by the base station, a mapping from an identification of the specified second UE to the index value via RRC signaling.

12. The methods, apparatuses, and articles of any of clauses 6-11, wherein the scheduling is with respect to a DG, further providing for scrambling, by the base station, a CRC of the DCI using a SL-RNTI corresponding to the first UE.

13. The methods, apparatuses, and articles of any of clauses 6-11, wherein the scheduling is with respect to a CG, further providing for scrambling, by the base station, a CRC of the DCI using a SL-CS-RNTI corresponding to the first UE.

14. The methods, apparatuses, and articles of any of clauses 1-13, further providing for associating, by the base station, one or more HARQ process identifiers with the specified second UE.

15. The methods, apparatuses, and articles of clause 14, wherein the DCI carries the one or more HARQ process identifiers to identify the specified second UE as a receiver UE for the sidelink.

16. The methods, apparatuses, and articles of any of clauses 14-15, wherein the associating the one or more HARQ process identifiers with the specified second UE leaves at least one HARQ process identifier unassociated with any particular sidelink receiver UE.

17. The methods, apparatuses, and articles of any of clauses 2-16, further providing for scrambling, by the base station, a CRC of the DCI based at least in part on an identifier corresponding to the specified second UE.

18. The methods, apparatuses, and articles of clause 17, wherein the scheduling is with respect to a DG, and wherein scrambling the CRC of the DCI provides for scrambling the CRC using a SL-TX-RX-RNTI corresponding to the first UE and the specified second UE.

19. The methods, apparatuses, and articles of clause 18, further providing for distributing, by the base station, the SL-TX-RX-RNTI to the first UE via RRC signaling.

20. The methods, apparatuses, and articles of clause 17, wherein the scheduling is with respect to a CG, and wherein scrambling the CRC of the DCI provides for scrambling the CRC using a SL-CS-TX-RX-RNTI corresponding to the first UE and the specified second UE.

21. The methods, apparatuses, and articles of clause 20, further providing for distributing, by the base station, the SL-CS-TX-RX-RNTI to the first UE via RRC signaling.

22. The methods, apparatuses, and articles of any of clauses 1-11, 13-17, and 20-21, wherein the scheduling is with respect to a CG, and wherein the control signaling comprises RRC signaling.

23. The methods, apparatuses, and articles of clause 22, further providing for configuring, by the base station, the first UE for the sidelink via the RRC signaling using an identification of the specified second UE.

24. Methods, apparatuses, and articles for wireless communication may provide for receiving, by a first UE from a base station, control signaling scheduling resources for a sidelink between the first UE and a specified second UE, wherein the first UE is in communication with the base station and is a UE to transmit to the specified second UE via the sidelink, and wherein the control signaling is configured to identify the specified second UE, and implementing, by the first UE based on the control signaling, the sidelink between the first UE and the specified second UE in accordance with the scheduling.

25. The methods, apparatuses, and articles of clause 24, wherein the control signaling comprises DCI.

26. The methods, apparatuses, and articles of clause 25, wherein the DCI is according to DCI format 3_0.

27. The methods, apparatuses, and articles of any of clauses 25-26, wherein the first UE operates under control of the base station to implement resources allocated to the sidelink between the first UE and the specified second UE as designated by the DCI.

28. The methods, apparatuses, and articles of any of clauses 25-27, further providing for providing, by the first UE to the base station via a PUCCH, an ACK/NACK configured for the base station determining if additional resource allocation is to be provided for the sidelink between the first UE and the specified second UE.

29. The methods, apparatuses, and articles of any of clauses 25-28, wherein the DCI is configured to carry a sidelink receiver UE indicator.

30. The methods, apparatuses, and articles of clause 29, wherein a field is included in the DCI to carry the sidelink receiver UE indicator.

31. The methods, apparatuses, and articles of clause 29, wherein a field of the DCI is repurposed to carry the sidelink receiver UE indicator.

32. The methods, apparatuses, and articles of any of clauses 29-31, wherein the sidelink receiver UE indicator comprises an index value corresponding to the specified second UE to indicate the specified second UE as a receiver UE for the sidelink.

33. The methods, apparatuses, and articles of clause 32, further providing for receiving, by the first UE from the base station, a mapping from an identification of the specified second UE to the index value via RRC signaling.

34. The methods, apparatuses, and articles of any of clauses 29-33, wherein the scheduling is with respect to a DG, and wherein a CRC of the DCI is scrambled using a SL-RNTI corresponding to the first UE.

35. The methods, apparatuses, and articles of any of clauses 29-33, wherein the scheduling is with respect to a CG, and wherein a CRC of the DCI is scrambled using a SL-CS-RNTI corresponding to the first UE.

36. The methods, apparatuses, and articles of any of clauses 24-35, wherein one or more HARQ process identifiers are associated with the specified second UE, and wherein the DCI carries the one or more HARQ process identifiers to identify the specified second UE as a receiver UE for the sidelink.

37. The methods, apparatuses, and articles of clause 36, wherein at least one HARQ process identifier remains unassociated with any particular sidelink receiver UE.

38. The methods, apparatuses, and articles of any of clauses 25-37, wherein a CRC of the DCI is scrambled based at least in part on an identifier corresponding to the specified second UE.

39. The methods, apparatuses, and articles of clause 38, wherein the scheduling is with respect to a DG, and wherein the CRC is scrambled using a SL-TX-RX-RNTI corresponding to the first UE and the specified second UE.

40. The methods, apparatuses, and articles of clause 39, further providing for receiving, by the first UE from the base station, the SL-TX-RX-RNTI via RRC signaling.

41. The methods, apparatuses, and articles of clause 38, wherein the scheduling is with respect to a CG, and wherein the CRC is scrambled using a SL-CS-TX-RX-RNTI corresponding to the first UE and the specified second UE.

42. The methods, apparatuses, and articles of clause 41, further providing for receiving, by the first UE from the base station, the SL-CS-TX-RX-RNTI via RRC signaling.

43. The methods, apparatuses, and articles of any of clauses 24-33, 35-38, and 40-42, wherein the scheduling is with respect to a CG, and wherein the control signaling comprises RRC signaling.

44. The methods, apparatuses, and articles of clause 43, further providing for receiving, by the first UE from the base station, an identification of the specified second UE via the RRC signaling for configuring the first UE for the sidelink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to scheduling of resources for a sidelink between a first UE and a specified second UE may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 6 and 7) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   scheduling, by a base station, resources for a sidelink between a first user equipment (UE) and a specified second UE, wherein the first UE is in communication with the base station and is a UE to transmit to the specified second UE via the sidelink; and
   transmitting, by the base station, control signaling to the first UE to implement the sidelink between the first UE and the specified second UE in accordance with the scheduling, wherein the control signaling is configured to assign granted resources as link resources for the sidelink between the first UE and the specified second UE and is configured to specify to the first UE the specified second UE is a sidelink receiver UE for the sidelink by including at least one of:
      a hybrid automatic repeat request (HARQ) process identifier providing a sidelink RX UE indicator for the specified second UE; or
      a cyclic redundancy check (CRC) of downlink control information (DCI) of the control signaling scrambled using a radio network temporary identifier (RNTI) distributed to the first UE and the specified second UE that provides destination identification for the specified second UE.

2. The method of claim 1, further comprising:
   controlling, by the base station, resources allocated to the sidelink between the first UE and the specified second UE using downlink control information (DCI).

3. The method of claim 1, further comprising:
   determining, by the base station, if additional resource allocation is to be provided for the sidelink between the first UE and the specified second UE based at least in part on an acknowledgment/negative-acknowledgment (ACK/NACK) received from the first UE via a physical uplink control channel (PUCCH).

4. The method of claim 1, wherein the DCI is configured to carry the HARQ process identifier for the sidelink receiver UE specified by the base station.

5. The method of claim 4, wherein the scheduling is with respect to a dynamic grant (DG), the method further comprising:

scrambling, by the base station, the CRC of the DCI using a sidelink-radio network temporary identifier (SL-RNTI) corresponding to the first UE.

6. The method of claim 4, wherein the scheduling is with respect to a configured grant (CG), the method further comprising:
scrambling, by the base station, the CRC of the DCI using a sidelink-configured scheduling-radio network temporary identifier (SL-CS-RNTI) corresponding to the first UE.

7. The method of claim 1, wherein the control signaling includes the HARQ process identifier providing the sidelink RX UE indicator for the specified second UE, and wherein the DCI carries one or more HARQ process identifiers including the HARQ process identifier providing the sidelink RX UE indicator for the specified second UE.

8. The method of claim 1, wherein the CRC of the DCI is scrambled using the RNTI distributed to the first UE and the specified second UE that provides the destination identification for the specified second UE.

9. The method of claim 8, wherein the scheduling is with respect to a dynamic grant (DG), and wherein
the RNTI comprises a sidelink-transmitter UE-receiver UE-radio network temporary identifier (SL-TX-RX-RNTI) corresponding to the first UE and the specified second UE.

10. The method of claim 8, wherein the scheduling is with respect to a configured grant (CG), and wherein
the RNTI comprises a sidelink-configured scheduling-transmitter UE-receiver UE-radio network temporary identifier (SL-CS-TX-RX-RNTI) corresponding to the first UE and the specified second UE.

11. An apparatus configured for wireless communication, the apparatus comprising:
at least one processor; and
a memory coupled to the at least one processor, wherein the at least one processor is configured:
to schedule, by a base station, resources for a sidelink between a first user equipment (UE) and a specified second UE, wherein the first UE is in communication with the base station and is a UE to transmit to the specified second UE via the sidelink; and
to transmit, by the base station, control signaling to the first UE to implement the sidelink between the first UE and the specified second UE in accordance with the scheduling, wherein the control signaling is configured to assign granted resources as link resources for the sidelink between the first UE and the specified second UE and is configured to specify to the first UE the specified second UE is a sidelink receiver UE for the sidelink by including at least one of:
a hybrid automatic repeat request (HARQ) process identifier providing a sidelink RX UE indicator for the specified second UE; or
a cyclic redundancy check (CRC) of downlink control information (DCI) of the control signaling scrambled using a radio network temporary identifier (RNTI) distributed to the first UE and the specified second UE that provides destination identification for the specified second UE.

12. The apparatus of claim 11, wherein the at least one processor is further configured:
to determine, by the base station, if additional resource allocation is to be provided for the sidelink between the first UE and the specified second UE based at least in part on an acknowledgment/negative-acknowledgment (ACK/NACK) received from the first UE via a physical uplink control channel (PUCCH).

13. The apparatus of claim 11, wherein the DCI is configured to carry the HARQ process identifier for the sidelink receiver UE specified by the base station, wherein if the scheduling is with respect to a dynamic grant (DG) the at least one processor is further configured to scramble the CRC of the DCI using a sidelink-radio network temporary identifier (SL-RNTI) corresponding to the first UE, and wherein if the scheduling is with respect to a configured grant (CG) the at least one processor is further configured to scramble the CRC of the DCI using a sidelink-configured scheduling-radio network temporary identifier (SL-CS-RNTI) corresponding to the first UE.

14. The apparatus of claim 11, wherein the control signaling includes the HARQ process identifier providing the sidelink RX UE indicator for the specified second UE, and wherein the DCI carries one or more HARQ process identifiers including the HARQ process identifier providing the sidelink RX UE indicator for the specified second UE.

15. The apparatus of claim 11, wherein the CRC of the DCI is scrambled using the RNTI distributed to the first UE and the specified second UE that provides based at least in part on the destination identification for the specified second UE, wherein if the scheduling is with respect to a dynamic grant (DG) the RNTI comprises a sidelink-transmitter UE-receiver UE-radio network temporary identifier (SL-TX-RX-RNTI) corresponding to the first UE and the specified second UE, and wherein if the scheduling is with respect to a configured grant (CG) the RNTI comprises a sidelink-configured scheduling-transmitter UE-receiver UE-radio network temporary identifier (SL-CS-TX-RX-RNTI) corresponding to the first UE and the specified second UE.

16. A method of wireless communication, comprising:
receiving, by a first user equipment (UE) from a base station, control signaling scheduling resources for a sidelink between the first UE and a specified second UE, wherein the first UE is in communication with the base station and is a UE to transmit to the specified second UE via the sidelink, and wherein the control signaling is configured to assign granted resources as link resources for the sidelink between the first UE and the specified second UE and is configured to specify to the first UE the specified second UE is a sidelink receiver UE for the sidelink by including at least one of:
a hybrid automatic repeat request (HARQ) process identifier providing a sidelink RX UE indicator for the specified second UE; or
a cyclic redundancy check (CRC) of downlink control information (DCI) of the control signaling scrambled using a radio network temporary identifier (RNTI) distributed to the first UE and the specified second UE that provides destination identification for the specified second UE; and
implementing, by the first UE based on the control signaling, the sidelink between the first UE and the specified second UE in accordance with the scheduling.

17. The method of claim 16, wherein the first UE operates under control of the base station to implement resources allocated to the sidelink between the first UE and the specified second UE as designated by downlink control information (DCI).

18. The method of claim 16, further comprising:
providing, by the first UE to the base station via a physical uplink control channel (PUCCH), an acknowledgment/negative-acknowledgment (ACK/NACK) configured for the base station determining if additional resource allocation is to be provided for the sidelink between the first UE and the specified second UE.

19. The method of claim 16, wherein the DCI is configured to carry the HARQ process identifier for the sidelink receiver UE specified by the base station.

20. The method of claim 19, wherein the scheduling is with respect to a dynamic grant (DG), and wherein the CRC of the DCI is scrambled using a sidelink-radio network temporary identifier (SL-RNTI) corresponding to the first UE.

21. The method of claim 19, wherein the scheduling is with respect to a configured grant (CG), and wherein the CRC of the DCI is scrambled using a sidelink-configured scheduling-radio network temporary identifier (SL-CS-RNTI) corresponding to the first UE.

22. The method of claim 16, wherein the control signaling includes the HARQ process identifier providing the sidelink RX UE indicator for the specified second UE, and wherein the DCI carries one or more HARQ process identifiers including the HARQ process identifier providing the sidelink RX UE indicator for the specified second UE.

23. The method of claim 16, wherein the CRC of the DCI is scrambled using the RNTI distributed to the first UE and the specified second UE that provides the destination identification for the specified second UE.

24. The method of claim 23, wherein the scheduling is with respect to a dynamic grant (DG), and wherein the RNTI comprises a sidelink-transmitter UE-receiver UE-radio network temporary identifier (SL-TX-RX-RNTI) corresponding to the first UE and the specified second UE.

25. The method of claim 23, wherein the scheduling is with respect to a configured grant (CG), and wherein the RNTI comprises a sidelink-configured scheduling-transmitter UE-receiver UE-radio network temporary identifier (SL-CS-TX-RX-RNTI) corresponding to the first UE and the specified second UE.

26. An apparatus configured for wireless communication, the apparatus comprising:
at least one processor; and
a memory coupled to the at least one processor, wherein the at least one processor is configured:
to receive, by a first user equipment (UE) from a base station, control signaling scheduling resources for a sidelink between the first UE and a specified second UE, wherein the first UE is in communication with the base station and is a UE to transmit to the specified second UE via the sidelink, and wherein the control signaling is configured to assign granted resources as link resources for the sidelink between the first UE and the specified second UE and is configured to specify to the first UE the specified second UE is a sidelink receiver UE for the sidelink by including at least one of:
a hybrid automatic repeat request (HARQ) process identifier providing a sidelink RX UE indicator for the specified second UE; or
a cyclic redundancy check (CRC) of downlink control information (DCI) of the control signaling scrambled using a radio network temporary identifier (RNTI) distributed to the first UE and the specified second UE that provides destination identification for the specified second UE; and
to implement, by the first UE based on the control signaling, the sidelink between the first UE and the specified second UE in accordance with the scheduling.

27. The apparatus of claim 26, wherein the at least one processor is further configured:
to provide, by the first UE to the base station via a physical uplink control channel (PUCCH), an acknowledgment/negative-acknowledgment (ACK/NACK) configured for the base station determining if additional resource allocation is to be provided for the sidelink between the first UE and the specified second UE.

28. The apparatus of claim 26, wherein the DCI is configured to carry the HARQ process identifier for the sidelink receiver UE specified by the base station, wherein if the scheduling is with respect to a dynamic grant (DG) the CRC of the DCI is scrambled using a sidelink-radio network temporary identifier (SL-RNTI) corresponding to the first UE, and wherein if the scheduling is with respect to a configured grant (CG) the CRC of the DCI is scrambled using a SL-CS-RNTI corresponding to the first UE.

29. The apparatus of claim 26, wherein the control signaling includes the HARQ process identifier providing the sidelink RX UE indicator for the specified second UE, and wherein the DCI carries one or more HARQ process identifiers including the HARQ process identifier providing the sidelink RX UE indicator for the specified second UE.

30. The apparatus of claim 26, wherein the CRC of the DCI is scrambled using the RNTI distributed to the first UE and the specified second UE that provides the destination identification for the specified second UE, wherein if the scheduling is with respect to a dynamic grant (DG) the RNTI comprises a sidelink-transmitter UE-receiver UE-radio network temporary identifier (SL-TX-RX-RNTI) corresponding to the first UE and the specified second UE, and wherein if the scheduling is with respect to a configured grant (CG) the RNTI comprises a sidelink-configured scheduling-transmitter UE-receiver UE-radio network temporary identifier (SL-CS-TX-RX-RNTI) corresponding to the first UE and the specified second UE.

* * * * *